(No Model.) 2 Sheets—Sheet 1.

C. H. TAYLOR.
ORE CONCENTRATOR.

No. 398,863. Patented Mar. 5, 1889.

WITNESSES.
INVENTOR.

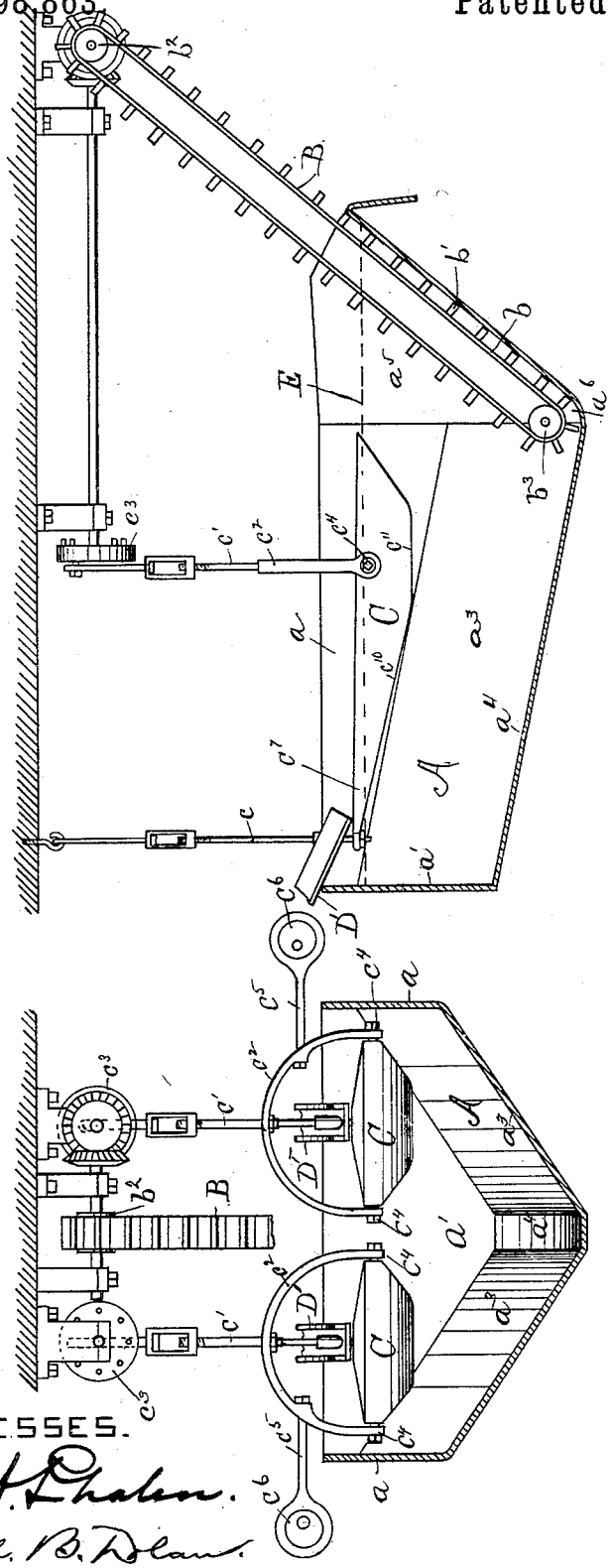

UNITED STATES PATENT OFFICE.

CHARLES H. TAYLOR, OF BOSTON, MASSACHUSETTS.

ORE-CONCENTRATOR.

SPECIFICATION forming part of Letters Patent No. 398,863, dated March 5, 1889.

Application filed July 14, 1887. Serial No. 244,240. (No model.)

*To all whom it may concern:*

Be it known that I, CHARLES H. TAYLOR, of Boston, in the county of Suffolk and State of Massachusetts, a citizen of the United States, have invented a new and useful Improvement in Ore-Concentrators, of which the following is a full, clear, and exact description, reference being had to the accompanying drawings, forming a part of this specification, in explaining its nature.

The invention relates to an ore-concentrator employing one or more pans contained or held in a tank filled with water, and in which water the pan or pans are given a vertical and horizontal vibratory movement; and the invention consists in certain constructions and combinations, as indicated by the claim appended to this specification.

Figure 1:
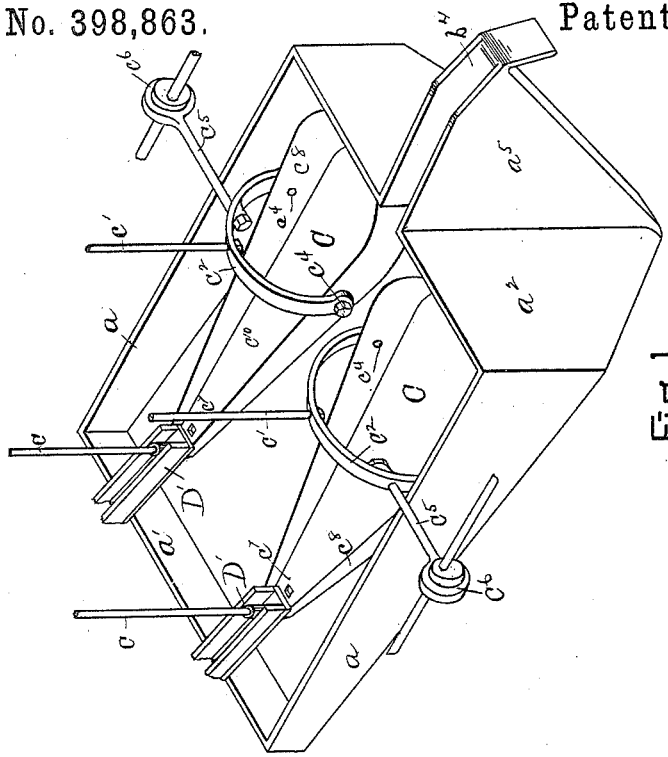
Figure 2:
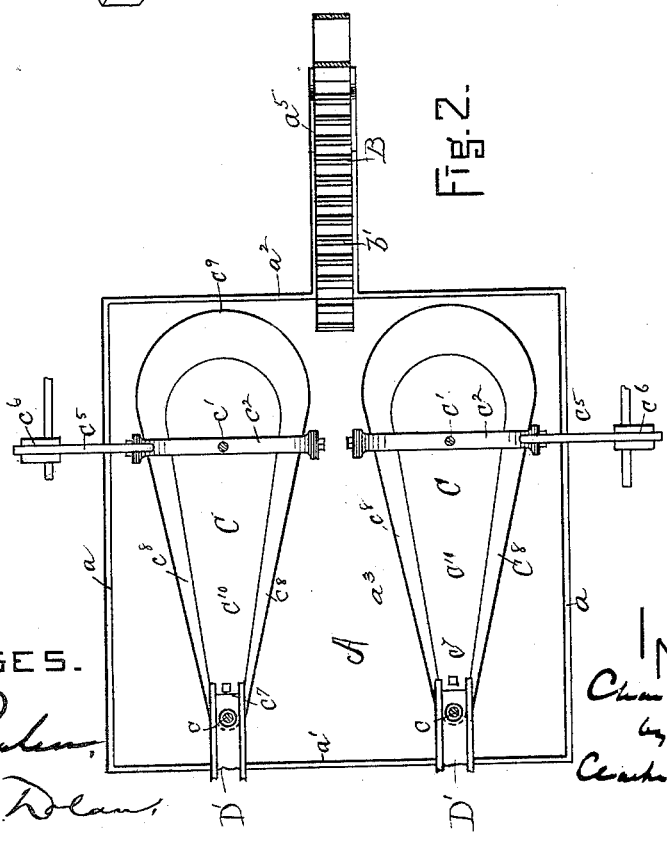

In the drawings, Figure 1 is a view in perspective of a concentrator having the features of my invention. Fig. 2 is a plan view thereof. Fig. 3 is a vertical central section thereof. Fig. 4 is a vertical cross-section thereof.

A is the tank. It preferably is formed from planks or sheet metal, and it has the side walls, $a$, the rear wall, $a'$, the front wall, $a^2$, and the bottom $a^3$, which is inclined from the lower edge of the side walls to the center $a^4$, and from the lower edge of the rear wall, $a'$, to the lower edge of the front wall, $a^3$, so as to form an inclined bottom. There is formed to project from the wall $a^2$ the boxing $a^5$, in which the tailings-elevator B works. The tailings-elevator extends to the pocket or lowest section, $a^6$, of the tank, to which the tailings are moved by gravity down the inclined surfaces of the bottom of the tank. Any suitable form of tailings-elevator may be used. I have shown a common construction comprising substantially a belt, $b$, having projections $b'$, and mounted upon an upper rotary pulley, $b^2$, and a lower pulley, $b^3$, which is secured to suitable supports in the lowest part of the tank, which is at the lower end of the passage $b^4$, formed by the box $a^5$, in which the elevator B runs.

I have represented in the drawings the tank as containing two pans, C, which are exactly alike. Each pan is suspended in the tank by a rod, $c$, attached to its rear end, and by the rod $c'$, which is attached at its lower end to a bail, $c^2$, and at its upper end to an eccentric, $c^3$. The bail is secured to the pan near the front end by pivots $c^4$. There is also attached to each bail $c^2$, to extend horizontally therefrom, a rod, $c^5$, extending to the eccentric $c^6$. The eccentric $c^3$, through the rod $c'$, provides the main part of the pan with a vertical movement or reciprocation, and the eccentric $c^6$ gives the pan a horizontal or sidewise movement or reciprocation, and the two movements are simultaneously communicated to the front end of the pan, the eccentric for providing it with a vertical movement having a throw of about seven inches and the eccentric providing it with a horizontal movement having a throw of about four inches and rotating from four to six times as rapidly as the eccentric for providing vertical reciprocations.

Each pan is shaped substantially as represented in the drawings—that is, it is made shallow and narrow at its rear end, $c^7$, and is gradually increased in depth and width to its center. It is made, preferably, of metal. Its sides $c^8$ extend in plan outwardly or diverge from the rear end and have a rounded front end, $c^9$. (See Fig. 2.) The sides also are inclined inward to the bottom $c^{10}$, and the bottom $c^{10}$ is inclined from the rear end, $c^7$, to the flat portion $c^{11}$. (See Fig. 3.) I prefer that the sides of the pan be joined to the bottom in a manner to form a curve rather than an angle, to facilitate the movement of the ore therein. Each pan has a sluiceway, D', formed by a trough for conveying crushed ore from the crusher or other source of supply to the shallow end of the pan, preferably by means of flowing water.

In operation the tank is filled with water to the dotted line E, Fig. 3, and the crushed ore is conveyed to the pans, and the pans caused to be vibrated and oscillated in the water, the shallow or stationary end of the pan being substantially upon the water-level, and the movable end being hung so as to be alternately dipped into the water and elevated slightly from it. This movement of the pan causes the heavier particles of ore to gradually work their way forward on the bottom of the pan, while the lighter substances are washed from the top of the pan into the tank, and, working their way into the pocket or lowest portion of the tank, are removed therefrom by the elevator B.

The concentrator is intended to take material directly from Cornish rolls, and without the screening, sizing, or handling of a similar nature, and it concentrates the coarse and fine particles of minerals, at the same time doing away with the necessity for jigs, screens, concentrating-tables, and their operating devices, which have heretofore been necessary in concentrating minerals; and not only do they enable this saving to be made, but they also concentrate very rapidly, so that four pans of proper size will concentrate all the mineral that can be run through a set of the largest size Cornish rolls—namely, from eighty to one hundred tons a day. Another advantage arising from their use is that they cost much less than the usual concentrating apparatus, and can be operated with much less power, and by much less labor, and they can be worked equally well with a stamp-battery, and will catch and concentrate sulphides, quicksilver, &c., and they can be used in silver-mills for concentrating the pulp after it leaves the settlers.

While I prefer to arrange the pans in pairs in a single tank and to place an elevator between the two for removing the tailings, as above specified, I would not be understood as limiting myself to this number of pans in one tank or to the particular location of the elevator.

In operation the crushed material, when coming from the rolls or stamps, is discharged from the sluiceway into the rear or shallow end of the pans, and is quickly and thoroughly concentrated there. The heavier portions of the mineral stay on the bottom and gradually slide forward on the pan-bottom, the lighter portions of the ground material staying on top and working off over the front end of the pan, when it falls on the inclined bottom of the tank and slides to the center, from which the elevator discharges it.

When it becomes necessary to remove the concentrated mineral or ore from the pan, the feeding of the crushed ore thereto is stopped, or the crushed ore is conveyed to another pan. The pan is then stopped and the upper or unconcentrated portion of the material therein is shoveled into the back end of another pan, and the remaining concentrated ore or mineral is then shoveled from the pan into a car or other receptacle at the side of the tank.

I prefer to make the pans about twelve feet long, twelve inches wide and four inches deep at the shallow end, and five feet wide at the widest point, and eighteen inches deep at the lower or discharge end.

I would say that I do not confine the invention to the concentrating of crushed ore, as it may be used for concentrating ore found in earth or gravel. I would also say that I do not confine myself to the particular mechanism herein described for providing the pans with the horizontal and perpendicular vibratory movements.

Having thus fully described my invention, I claim and desire to secure by Letters Patent of the United States—

The combination, with the water-tank and the inclined bottomed pan C, shallow and narrow at its receiving end and wider and deeper at its discharging end, said pan being pivoted at its receiving end, of the yoke $c^2$, attached to said pan, the eccentric and pitman by which said pan is suspended and reciprocated vertically, and the eccentric and pitman for giving lateral movements to said pan, substantially as set forth.

CHAS. H. TAYLOR.

In presence of—
F. F. RAYMOND, 2d,
FRED. B. DOLAN.